United States Patent
Russell et al.

[11] 3,974,629
[45] Aug. 17, 1976

[54] LAWN MOWER WITH IMPROVED MULCHING ATTACHMENT

[76] Inventors: Lionel E. Russell, Rte. 1, Oologah, Okla. 74053; David Franklin McNabb, Drawer C, Catoosa, Okla. 74015

[22] Filed: June 18, 1975

[21] Appl. No.: 587,956

[52] U.S. Cl. ............................... 56/13.7; 56/320.2
[51] Int. Cl.² ..................................... A01D 35/264
[58] Field of Search .................. 56/13.6, 13.7, 13.8, 56/13.3, 13.4, 17.5, 255, 320.2

[56] References Cited
UNITED STATES PATENTS

| | | | |
|---|---|---|---|
| 2,664,686 | 1/1954 | Witt | 56/30 |
| 2,771,730 | 11/1956 | True | 56/11.6 |
| 2,791,080 | 5/1957 | Shaw | 56/320.2 |
| 2,823,508 | 2/1958 | Brown | 56/16.4 |
| 2,956,386 | 10/1960 | Niemann | 56/13.8 |
| 2,983,096 | 5/1961 | Phelps | 56/255 |
| 3,008,284 | 11/1961 | Bright | 56/320.2 |
| 3,058,284 | 10/1962 | Anderson | 56/13.3 |
| 3,453,812 | 7/1969 | Heidner et al. | 56/320.2 |

*Primary Examiner*—Russell R. Kinsey
*Attorney, Agent, or Firm*—Head, Johnson & Chafin

[57] ABSTRACT

A lawn mower having means for chopping grass cutting, leaves and the like into small sizes for depositing the cut material in the form such that it will serve as mulch and not have to be raked from a lawn after it is cut, the mower including an inverted cup shaped frame having wheels and a handle, the frame having an outlet chute at one side, a prime mover supported on the frame, a vertical shaft supported by the frame having the horizontal cutting blade affixed to the shaft below the frame, the prime mover being coupled to rotate the vertical shaft, a rotatable auxiliary blade supported in the outlet chute, the auxiliary blade supported in the outlet chute, the auxiliary blade having a shaft extending therefrom and means of coupling the prime mover to rotate the auxiliary blade shaft so that cuttings discharged through the outlet chute pass the rotating auxiliary blade and are cut into small sizes.

6 Claims, 7 Drawing Figures

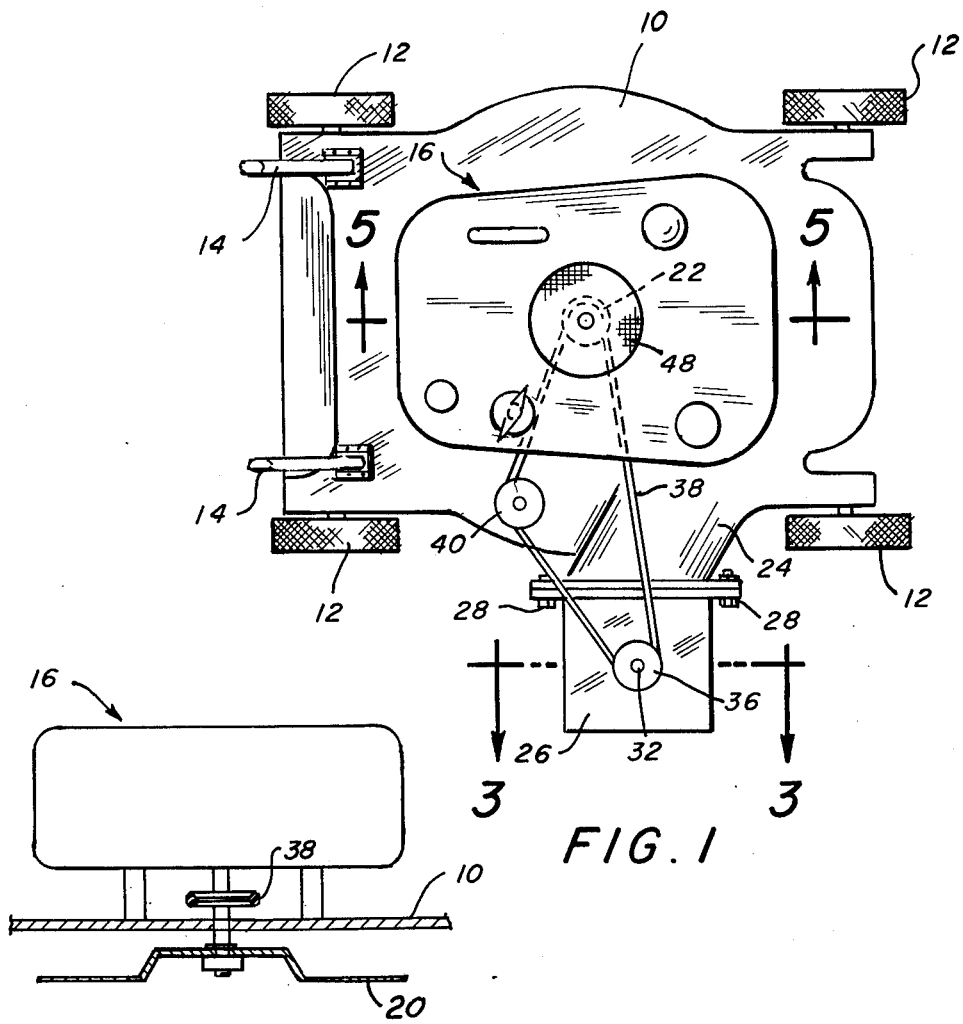
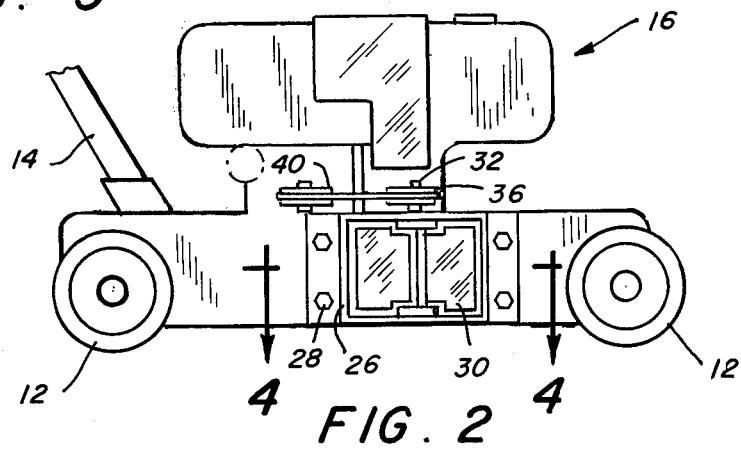

LAWN MOWER WITH IMPROVED MULCHING ATTACHMENT

BACKGROUND AND OBJECTS OF THE INVENTION

The most commonly used lawn mower today is of the type having an inverted cup shaped frame with a prime mover, usually a gasoline powered engine but sometimes an electric motor, mounted on the frame with a vertical shaft extending through the frame and a horizontal cutting blade affixed to the shaft below the frame. The horizontal blade rotates at a fast rate, cutting grass. The rotating force of the blade blows the grass out a side opening outlet chute formed in the frame.

In order to improve the discharge of the cut grass out the side opening chute, some blades have a small portion which is curved upwardly at the outer end to provide a fan effect. This helps lift the grass up as it is cut and forces air out the outlet chute to carry the cuttings with it.

Lawn cuttings, particularly if the grass is high when cut, may be of relatively large size and when deposited directly onto a lawn tend to shade the grass and interfere with its growth. In addition, the deposited cuttings are unsightly. For this reason many meticulous gardeners rake the grass cuttings or attach collecting receptacles to the lawn mower to catch the cuttings as they are discharged out of the housing outlet chute.

It is known that if the cuttings are sufficiently fine they will sift down between the blades of grass on the lawn so as not to shade the grass. At the same time fine cuttings form a mulch, preventing evaporation of water from the soil. In addition, fine grass cuttings caught in a receptacle or grass catcher are more readily reacted by bacteria and therefore when placed in a compost pile will be more quickly converted by bacteria into usable compost.

For this reason it is desirable that the cuttings emanating from a lawn mower be as fine as possible. The present invention is directed towards a lawn mower having a means of chopping cut grass, leaves and the like into small sizes.

It is therefore an object of this invention to provide an improved lawn mower which cuts grass, leaves and other material which is discharged out of a side chute with an auxiliary cutter to cut the grass cuttings into small sizes.

This general object, as well as other and more specific objects of the invention will be fulfilled in the following description and claims, taken in conjunction with the attached drawings.

DESCRIPTION OF VIEWS

FIG. 1 is a top view of an improved lawn mower of this invention.

FIG. 2 is a side view of the lawn mower of FIG. 1 showing the improved feature of this invention.

FIG. 5 is a cross-sectional view of the lawn mower taken along the line 5—5 of FIG. 1.

SUMMARY OF THE INVENTION

Figure 3:
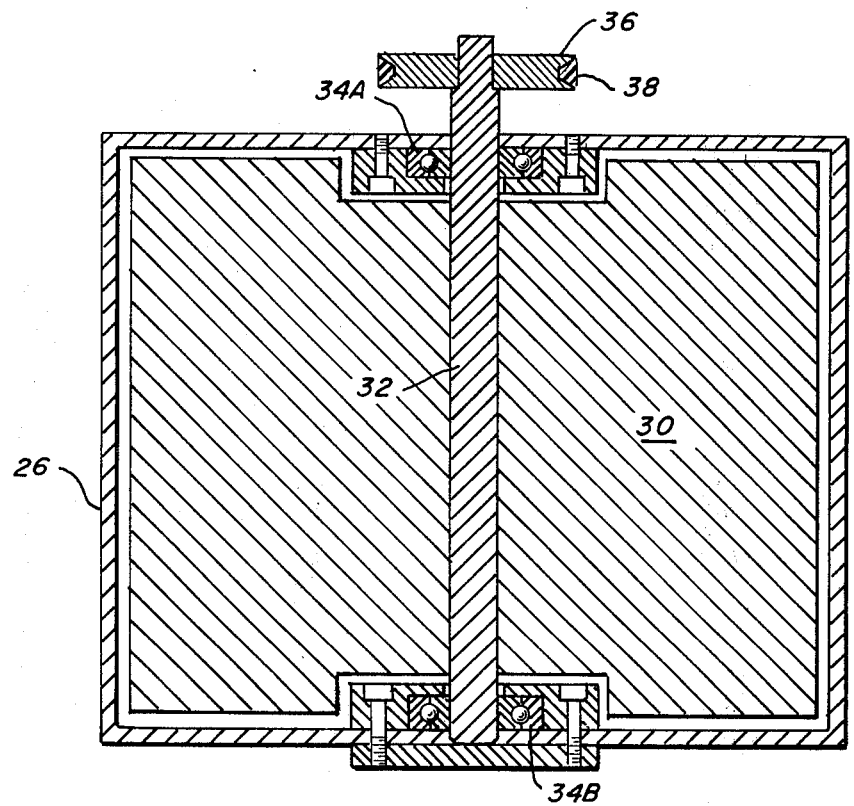
FIG. 3 is a cross-sectional view taken along the line 3—3 of FIG. 1 showing the auxiliary cutter attachment.

The invention is directed towards a lawn mower of the most commonly used type, that is, having a horizontal deck and vertical side walls therearound, a vertical shaft supported in the housing, a rotating horizontal blade affixed to the shaft below the housing which cuts the grass and a prime mover mounted on top of the housing for rotating the shaft, the invention including the addition to this usual arrangement, an auxiliary cutter at the outlet chute in the side of the housing through which the cut grass passes, the auxiliary cutter having a rotatable blade therein, and means for coupling the rotatable blade to the prime mover so that as the cut grass passes out through the auxiliary outlet it is chopped into small sizes.

DETAILED DESCRIPTION

Referring to the drawings and first to FIG. 1, a top view of a lawn mower incorporating the principles of the invention is illustrated. The lawn mower includes a frame housing 10 having a horizontal deck portion and vertical extending frame side walls having wheels 12 by which the mower is moved on the ground and a handle portion 14 partially shown.

Mounted on top of the housing 10 is a prime mover, in this case a gasoline powered engine generally indicated by the numeral 16. It is understood that the prime mover may also be an electric motor.

As shown in FIG. 5, there is supported by the frame 10 a vertical shaft 18 which extends through the housing 10. Affixed to the shaft 18 below the housing is a horizontal cutting blade 20. In the most common arrangement the vertical shaft 18 is the drive shaft of engine 16, although in some lawn mowers the prime mover 16 may have a horizontal drive shaft, in which case pulleys connect the prime mover drive shaft with the vertical drive shaft 18. Affixed to the vertical drive shaft 18 above housing 10 is a drive pulley 22.

Referring back to FIG. 1, the housing 10 has an outlet chute 24 in the side thereof through which grass cuttings are discharged. Affixed to the outlet chute is a chute extension 26 which may be made integral with the housing 10 or removably attached to it as illustrated. When removably attached the chute may have a flange as shown supported to a mating flange on the frame 10 so that the chute is held in place by bolts 28.

An auxiliary blade 30 (see FIG. 2) is rotatably supported within auxiliary chute extension 26. As shown in FIG. 3, the blades 30 are affixed to a vertical auxiliary shaft 32. Upper and lower bearings 34A and 34B may be provided in the chute extension 26 to support the auxiliary shaft. Affixed to one end of the shaft 32 is a sheave 36.

Figure 4:
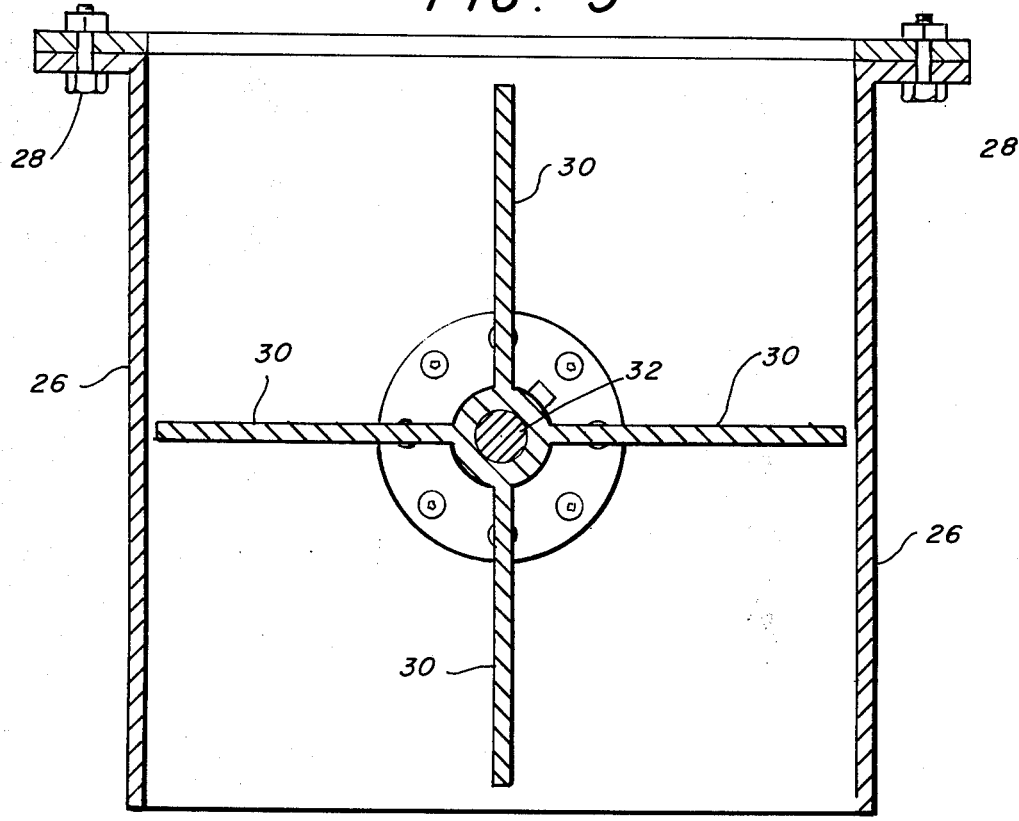
FIG. 4 is a cross-sectional view of the auxiliary cutter attachment taken along the line 4—4 of FIG. 2.

The blade 30 may be of a variety of configurations. In the illustrated arrangement of FIG. 4 there are four blades 30 extending from shaft 32. Obviously, one, two, three or more blades may be employed.

Referring again to FIG. 1, a belt 38 is looped around sheave 22 and sheave 36 so that prime mover 16, when rotating the cutting blade 20, also rotates the auxiliary cutting blade 30. To insure proper tension of belt 18, a pulley 40 is rotatably positioned on the top of the frame 10 and may be positionably adjustable so as to apply the correct tension to belt 38.

OPERATION

By means of prime mover 16 shaft 18 rotates horizontal cutting blade 20, cutting grass and forcing it out through chute 24 in the side of housing 10. At the same time the auxiliary blade 30 is rotated. As the grass moves through the auxiliary chute 26 it passes the rapidly rotating auxiliary blade 30 and is cut into small sizes. The cuttings are then discharged out of the auxiliary chute. The small cuttings may be collected in a bag (not shown) in the normal manner.

ALTERNATE EMBODIMENT

Figure 6:
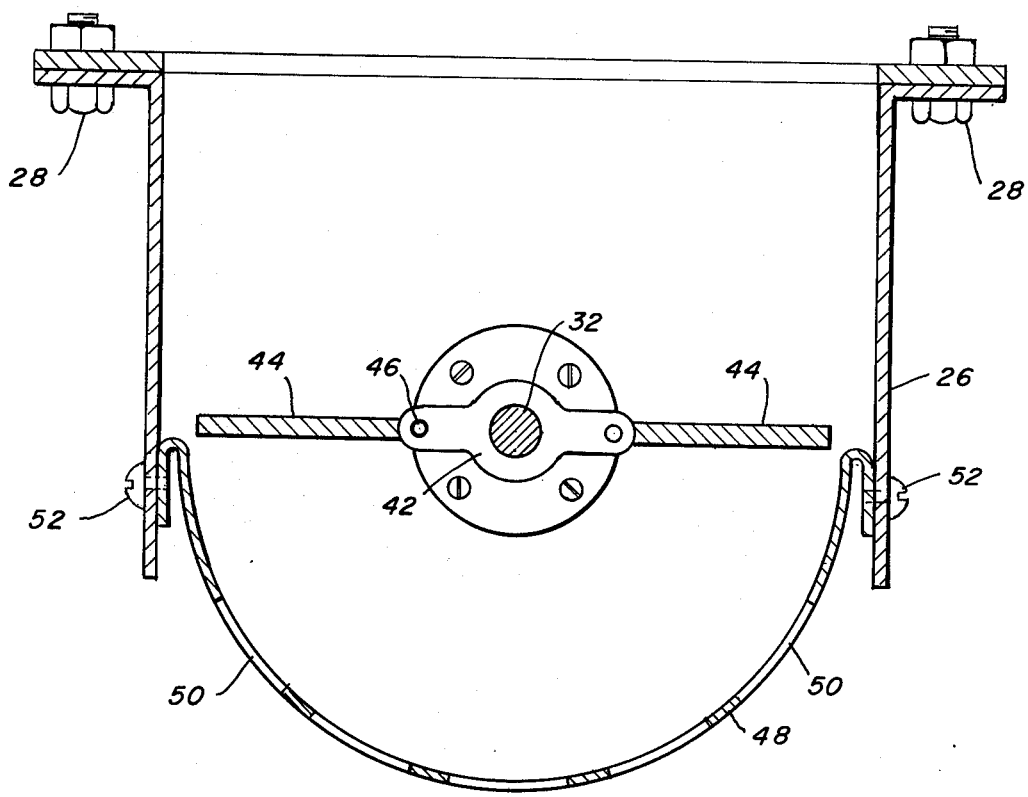
FIG. 6 is a cross-sectional view as shown in FIG. 4 but showing an alternate embodiment of the invention.
Figure 7:
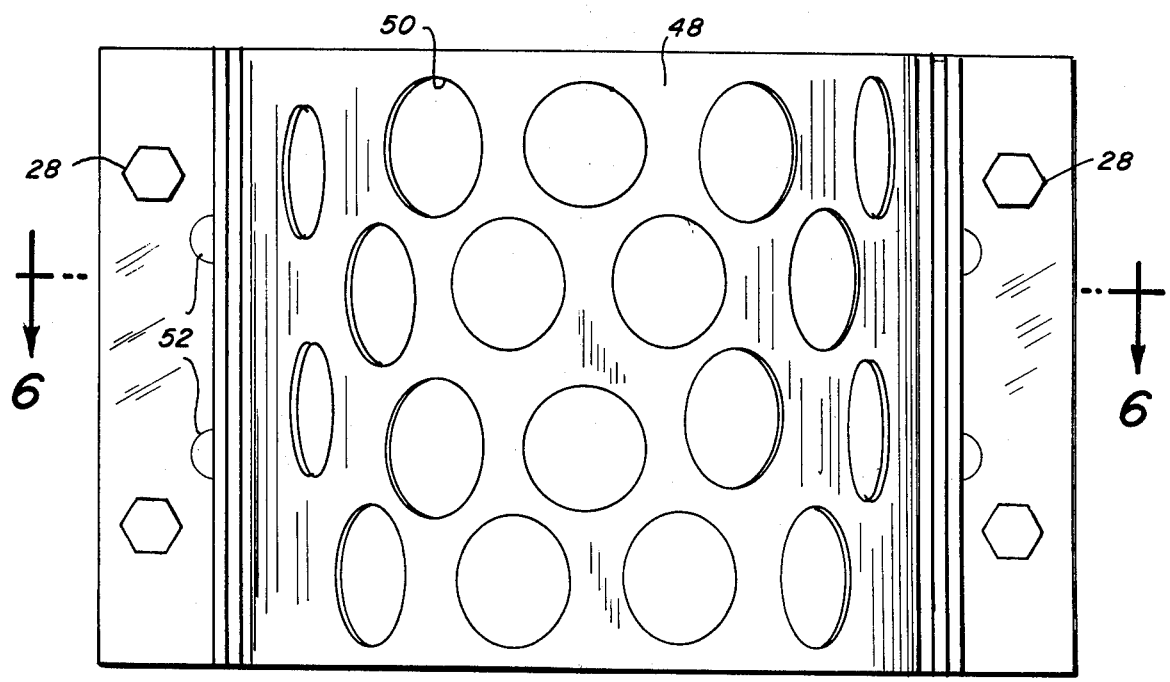
FIG. 7 is an end view of the auxiliary cutter attachment showing the alternate embodiment.

FIGS. 6 and 7 show an alternate arrangement of the invention. In this embodiment the auxiliary cutting blades are formed of two portions, that is, a hub portion 42 which is affixed to auxiliary shaft 32 and outer pivoted blades 44. The outer blade portions 44 are pivoted to the hub portion 42 by pins 46. In this arrangement the rotation of the auxiliary shaft 32 rotates the hub 42 and thereby the pivoted blades 44. If a large hard object, such as a rock, limb, piece of metal or the like, is picked up by the cutting blade of the mower and discharged through the outlet chute 24 it can pass through the outlet chute without damaging the blades 44 since they will strike the object but will not be broken by it as they will pivot relative to the rotating hub 42.

Another embodiment illustrated in FIGS. 6 and 7 is the provision of a screen 48 in the outer end of the auxiliary chute 26. The screen 42 is preferably a semicircle with auxiliary shaft 32 as the center. The outer tips of pivoted blades 44 pass near the screen 48. Openings 50 in the screen permit cuttings to pass therethrough. The size of the openings 50 regulates the size of the cuttings which are discharged, the smaller the opening the smaller the size of discharge cuttings. The use of the pivoted blades 44 and screen 48 provides a hammermill effect which insures the selectable fineness of the grass cuttings which are discharged. In addition, the screen 48 serves as a safety feature to prevent a blade 44 which might inadvertently become disconnected from the hub 42 from being thrown outwardly and in like manner prevents other large hard objects from being discharged outwardly through the auxiliary chute 26.

The screen 48 may be removably supported to the auxiliary chute 26 by integral flanges at each end, held in place by bolts 52. In this manner the screen 48 may be changed and the user may thereby select a screen with the size of openings desired to thereby control the size of cuttings which are discharged from the mower.

The invention is applicable to the initial design and construction of lawn mowers. It may be applied to existing mowers by adapting pulley 22 between the frame 10 and the prime mower 16 and attaching the auxiliary chute 26 with the cutter blade 30 therein. It can be seen also that the lawn mower incorporating the principles of this invention may be designed such that the auxiliary cutter arrangement is provided as an optional extra.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element or step thereof is entitled.

What is claimed:

1. A lawn mower having means for chopping cut grass, leaves and the like into small sizes, comprising:
    a frame having a horizontal deck portion and vertical downwardly extending frame side walls therearound, the side walls having a discharge opening therein, the frame having wheels for moving over the ground and a handle extending therefrom for guiding the mower;
    a prime mover supported on the frame horizontal deck portion;
    a vertical shaft rotatably supported centrally of the frame, the shaft extending through the frame;
    a drive sheave positioned on said vertical shaft between said prime mover and said frame;
    a horizontal cutting blade affixed to the shaft below the frame deck portion by which grass is cut and expelled along with leaves and the like out through said discharge opening;
    a chute affixed to said frame communicating with said discharge opening, the chute being outside the rotational area of said horizontal cutting blade, the frame side walls and chute being arranged so that cut grass, leaves and the like are expelled through said chute by the action of said horizontal cutting blade and the chute being defined by horizontal top and bottom walls and vertical side walls providing an enclosed rectangular passageway therethrough;
    a vertical auxiliary shaft supported within said chute by bearings affixed to said chute top and bottom walls, the vertical auxiliary shaft extending through an opening in said top wall;
    rectangular chopping blades affixed to said auxiliary shaft within said chute, the periphery of the blades conforming in close proximity to said rectangular passageway in said chute;
    a driven sheave positioned on said auxiliary shaft above said chute; and
    a belt looped around said drive sheave and said driven sheave whereby said chopping blades are rotated by said prime mover to chop into small pieces cut grass, leaves and the like expelled through the chute.

2. A lawn mower according to claim 1 wherein said chute is removably attachable to said frame at said discharge opening.

3. A lawn mower according to claim 1 wherein said rectangular chopping blades are in the form of at least four blades, each affixed to and extending radially from said auxiliary shaft and evenly spaced around said auxiliary shaft whereby said chute passageway is substantially closed at all times against the passage of large objects therethrough.

4. A lawn mower according to claim 1 in which the outer portions of said chopper blades are pivotally supported to inner portions.

5. A lawn mower according to claim 1 including a screen covering said outlet chute opening.

6. A lawn mower according to claim 5 in which said screen is semi-circular with said auxiliary blade shaft as the center.

* * * * *